United States Patent [19]

Uno et al.

[11] Patent Number: 4,659,267

[45] Date of Patent: Apr. 21, 1987

[54] PREFASTENABLE TORQUE-SHEAR BOLT

[75] Inventors: Nobuyoshi Uno; Takayoshi Isa, both of Kitakyushu; Eijiro Kurata; Hidetoshi Tamasaki, both of Yukuhashi, all of Japan

[73] Assignees: Nippon Steel Corporation, Tokyo; Nippon Steel Bolten Co., Ltd., Yukuhashi, both of Japan

[21] Appl. No.: 803,654

[22] Filed: Nov. 29, 1985

[30] Foreign Application Priority Data

Nov. 29, 1984 [JP] Japan .................. 59-252128

[51] Int. Cl.⁴ .............................................. F16B 31/00
[52] U.S. Cl. .......................................... 411/5; 411/43; 411/410
[58] Field of Search ................................... 411/2–5, 411/43, 410, 411; 10/27 R

[56] References Cited

U.S. PATENT DOCUMENTS 3,129,630  4/1964  Wing et al. ..................... 411/43
3,444,775  5/1969  Hills ............................... 411/5
4,492,500  1/1985  Ewing ........................... 411/410

FOREIGN PATENT DOCUMENTS 52-128873  9/1977  Japan ............................ 411/5

Primary Examiner—Gary L. Smith
Assistant Examiner—Neill Wilson
Attorney, Agent, or Firm—Wenderoth, Lind & Ponack

[57] ABSTRACT

A prefastenable torque-shear bolt has a bolt cut with a thread adapted to engage a nut, and full-fastening and prefastening grips each having wrench-engaging surfaces. One end of the bolt continues to a first transition portion that is tapered like a truncated cone. The full-fastening grip extends from the first transition portion and a full-fastening break-off groove. One end of the full-fastening grip continues to a second transition portion tapered like a truncated cone. The prefastening grip extends from the second transition portion and a prefastening break-off groove. The effective area of the fracture surface of the prefastening break-off groove is smaller than that of the full-fastening break-off groove. A first burr that arises on the threaded portion side when the full-fastening break-off groove is formed by rolling is formed on the first transition portion, and the outside diameter of the first burr is smaller than the diameter of the thread bottom in the threaded portion. A second burr that arises on the full-fastening grip side when the prefastening break-off groove is formed by rolling is formed on the second transition portion.

2 Claims, 10 Drawing Figures

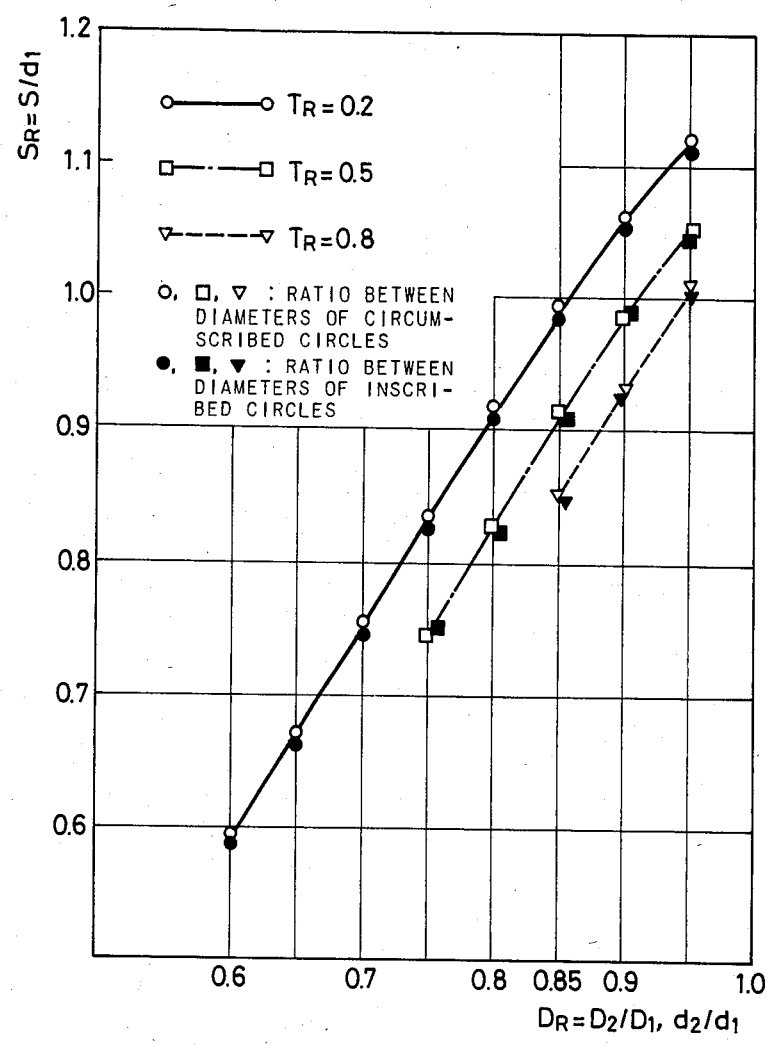

PREFASTENABLE TORQUE-SHEAR BOLT

BACKGROUND OF THE INVENTION

1. Field of the Invention

This invention relates to a prefastenable torque-shear bolt that can be mass-produced at low cost.

2. Description of the Prior Art

Prefastenable torque-shear bolts are used in the field of civil engineering and building where steel structural members to be connected are initially prefastened and afterwards are fully tightened with predetermined forces. The desired tightening force is obtained when a break-off groove cut in a bolt shears off when the designed torque is attained. Accordingly, each bolt is cut with two break-off grooves having fracture surfaces of different sizes, one spaced from the other along the axis of the bolt.

FIG. 1 shows an example of a conventional torque-shear bolt, which comprises a prefastening grip 2 and a full-fastening grip 3. The prefastening grip 2 is connected to the full-fastening grip 3 through a prefastening break-off groove 4, while the full-fastening grip 3 is connected to a threaded portion 6 through a full-fastening break-off groove 5. The effective area of the fracture surface of the prefastening break-off groove 4 is smaller than that of the full-fastening break-off groove 5. With this conventional torque-shear bolt 1, the prefastening grip 2 and the full-fastening grip 3 are of the same shape. Furthermore, the diameter D of a circle circumscribed around a polygon 8 on the prefastening grip 2 defined by rugged surfaces 7 with which a wrench engages is equal to that of the full-fastening grip 3, and the diameter d of a circle inscribed in a polygon 8 on the prefastening grip 2 is equal to that on the full-fastening grip 3 (as described, for example, in Japanese Provisional Utility Model Publication No. 52-128873 of 1977). When the prefastening break-off groove 4 is formed by rolling, burrs 10, whose total volume is equal to the volume of the steel 9 removed from the groove, are formed at the left end of the prefastening grip 2 and at the right end of the full-fastening grip 3 as shown in FIG. 3. Similar burrs are also produced when the full-fastening break-off groove 5 is formed. Consequently, the finished bolt 1 has the burrs 10 projecting on both sides of the two break-off grooves 4 and 5.

When joining together two steel plates 17 and 18 with a bolt 1 and a nut 11 using a tightening device 13, as shown in FIG. 4, the nut 11 is turned after fitting an inner socket 14 to the full-fastening grip 3 and an outer socket 15 to the nut 11. On this occasion, the inner socket 14 can be fitted over the prefastening grip 2. On completion of prefastening, however, the inner socket 14 cannot proceed to engage with the full-fastening grip 3 because of the burrs 10 standing in the way, as a consequence of which the bolt 1 fails to perform the desired function.

To remove such detrimental burrs 10 resulting from the roll-forming of the break-off grooves 4 and 5, a separate additional machining process is needed. This has not only hampered efficient mass-production but also has pushed up the production cost.

SUMMARY OF THE INVENTION

This invention is intended for obviating the shortcomings of the conventional torque-shear bolts described above. An object of this invention is to provide a torque-shear bolt that permits a tightening wrench to fit onto the tightening grips without being interfered with by burrs.

Another object of this invention is to provide a torque-shear bolt that can be mass-produced at low cost and free from the need of removing burrs that may result from the roll-forming of break-off grooves.

A torque-shear bolt according to this invention comprises a bolt proper cut with a thread to engage with a mating nut and full-fastening and prefastening grips having surfaces with which a tightening wrench engages.

The bolt proper has a first transition portion that is shaped like a truncated cone and tapers off from one end thereof. The first transition portion continues to a full-fastening grip through a full-fastening break-off groove. A second transition portion is also shaped like a truncated cone and tapers off from one end of the full-fastening grip. The second transition portion is connected to a prefastening grip through a prefastening break-off groove. The effective area of the fracture surface of the prefastening break-off groove is smaller than that of the full-fastening break-off groove. The diameters of second circles circumscribed around and inscribed in a polygon defined by wrench-engaging surfaces of the prefastening grip are respectively smaller than the diameters of first circles circumscribed around and inscribed in a polygon defined by wrench-engaging surfaces of the full-fastening grip. When the full-fastening break-off groove is roll-formed, a first burr is formed on said first transition portion next to the threaded portion. The outside diameter of the first burr is smaller than the diameter of the thread bottom. When the prefastening break-off groove is roll-formed, a second burr is formed on said second transition portion next to the full-fastening grip, with the outside diameter of the second burr being smaller than the diameter of said first inscribed circle.

Because the burrs that are produced when the break-off grooves are formed do not prevent the insertion of a tightening wrench, there is no need to reform or remove then by machining or other means. Therefore, these torque-shear bolts can be mass-produced with a greater cost advantage.

BRIEF DESCRIPTION OF THE DRAWINGS

FIG. 7 is a diagram showing an example of the relationship between the ratios between the diameters of the prefastening grip and the full-fastening grip and the burrs produced on a bolt.

DESCRIPTION OF THE PREFERRED EMBODIMENTS

Figure 5:
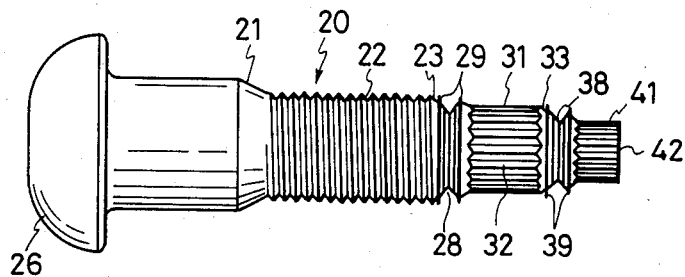
FIG. 5 is a front view showing a prefastenable torque-shear bolt according to the present invention.

FIG. 5 shows an example of a prefastenable torque-shear bolt according to this invention. This prefastenable torque-shear bolt 20 comprises a bolt proper 21 cut with a thread to engage with a mating nut, a full-fastening grip 31 and a prefastening grip 41 respectively having wrench-engaging surfaces 32 and 42.

The bolt proper 21 has a first transition portion 23 that tapers off toward one end shaped like a truncated cone and a bolt head 26 at the other end. The largest diameter of the first transition portion 23 is smaller than the diameter of the thread bottom, while the length thereof is at least such that a first burr 29, which is produced when a full-fastening break-off groove 28 is roll-formed, does not project beyond the first transition portion 23. Because of the need to cut a full-fastening break-off groove 28, the first transition portion 23 is tapered less sharply than the full-fastening break-off groove 28.

The full-fastening grip 31 extends from said first transition portion 23 and the full-fastening break-off groove 28 and has a plurality of wrench-engaging surfaces 32 around the periphery thereof. The diameter of a first circle circumscribed around a polygon defined by the wrench-engaging surfaces 32 is smaller than the diameter of the thread bottom. A tapered second transition portion 33 shaped like a truncated cone extends from one end of the full-fastening grip 31 opposite from the full-fastening break-off groove 28. The largest diameter of the second transition portion 33 is smaller than the diameter of the first circle inscribed in said polygon, while the length thereof is at least such that a second burr 39, which is produced when a prefastening break-off groove 38 is roll-formed, does not project beyond the second transition portion 33. Because of the need to cut a prefastening break-off groove 38, the second transition portion 33 is tapered less sharply than the full-fastening break-off groove 38.

The prefastening grip extends from said second transition portion and the prefastening break-off groove. The effective area of the fracture surface of the prefastening break-off groove is smaller than that of the full-fastening break-off groove. The prefastening grip has a plurality of wrench-engaging surfaces around the periphery thereof. The diameters of second circles circumscribed around and inscribed in a polygon defined by the wrench-engaging surfaces of the prefastening grip are smaller than those of said first circumscribed and inscribed circles.

When the full-fastening break-off groove is roll-formed, the first burr on the thread side is produced on said first transition portion. The outside diameter of the first burr is smaller than the diameter of the thread bottom. When the prefastening bread-off groove is roll-formed, the second burr on the full-fastening grip side is produced on said second transition portion. The outside diameter of the second burr is smaller than the diameter of said first inscribed circle.

Figure 6:
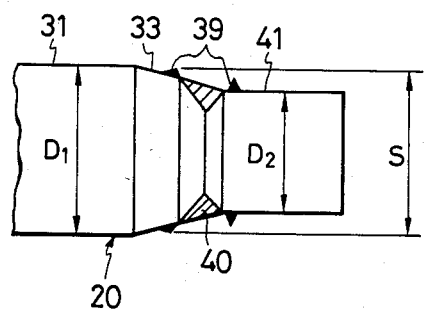
FIG. 6 shows burrs produced when a prefastening break-off groove is roll-formed.

It is known that the volume of a workpiece remains unchanged before and after the roll-forming of a break-off groove. The volume of the second burr 39 is equal to the volume 40 of steel that is removed when the prefastening break-off groove is roll-formed. With the above in mind, the height of the second burr 39 that is formed at one end of the full-fastening grip 31 less than the difference between the diameters of the prefastening grip 41 and the full-fastening grip 31, as shown in FIG. 6. Accordingly, the second burr 39 that might prevent the full-fastening grip 31 from fitting in the inner socket 14 of the tightening machine 13 is not produced at one end of the full-fastening grip 31 but on the second transition portion 33 next to the full-fastening grip 31. Furthermore, the outside diameter of the second burr 39 is smaller than the diameter of the circle inscribed in the polygon defined by the wrench-engaging surfaces of the full-fastening grip 31. The same applies to the first groove 29 formed on the first transition portion 23.

The ratio between the diameter $D_2$ of the circle circumscribed around the polygon defined by the wrench-engaging surfaces 42 of the prefastening grip 41 and the diameter $D_1$ of the circle circumscribed around the full-fastening grip 31 and the ratio between the diameter $d_2$ inscribed in the prefastening grip 41 and the diameter $d_1$ inscribed in the full-fastening grip 31 are preferably between 0.60 and 0.85 for the following reason.

FIG. 7 shows the relationship between the ratios between the diameters $D_2$ and $D_1$ of the circles circumscribed around the prefastening and full-fastening grips and the diameters $d_2$ and $d_1$ of the circles inscribed therein ($D_R = D_2/D_1$ and $d_2/d_1$) and the ratio indicating the degree of projection of the burr ($S_R = S/d_1$). Here, S designates the outside diameter of the burr 39 shown in FIG. 6. In the figure, while marks indicate the diameter ratios of the circumscribed circles and black marks those of the inscribed circles. The ratios of the torques applied in prefastening and full-fastening are set at 0.2, 0.5 and 0.8.

As is obvious from FIG. 7, the diameter ratio between the circumscribed circles $D_2/D_1$, the diameter ratio between the inscribed circles $d_2/d_1$ and ratio S indicating the projection of the burr are plotted on substantially the same curves. The ratio S decreases sharply as the diameter ratio $D_R$ becomes smaller. Usually, the prefastening torque is not more than 80 percent of the full-fastening torque. If the diameter ratio $D_R$ is 0.85 or under, the ratio $S_R$ will not exceed 1 or, in other words, the burr will not project beyond the diameter of the circle inscribed in the full-fastening grip. On the other hand, the required prefastening torque is unobtainable if the diameter ratio $D_R$ is under 0.60. Therefore, the preferable diameter ratio $D_R$ is between 0.60 and 0.85.

Figure 1:
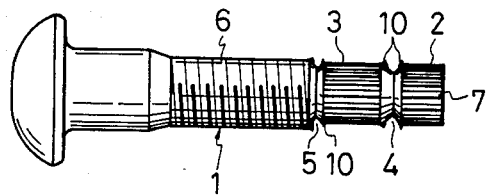
FIG. 1 is a front view of a conventional torque-shear bolt.
Figure 2:
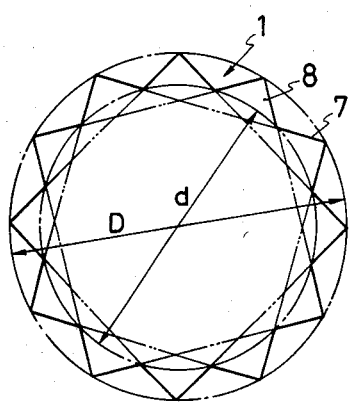
FIG. 2 is a side elevation view of a grip illustrating a polygon defined by wrench-engaging surfaces on the grip.
Figure 3:
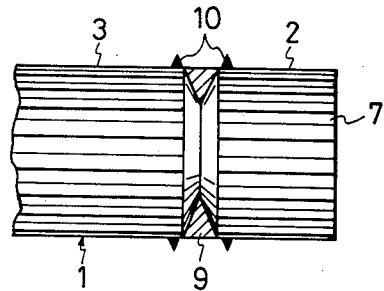
FIG. 3 shows burrs produced on a conventional torque-shear bolt.
Figure 4:
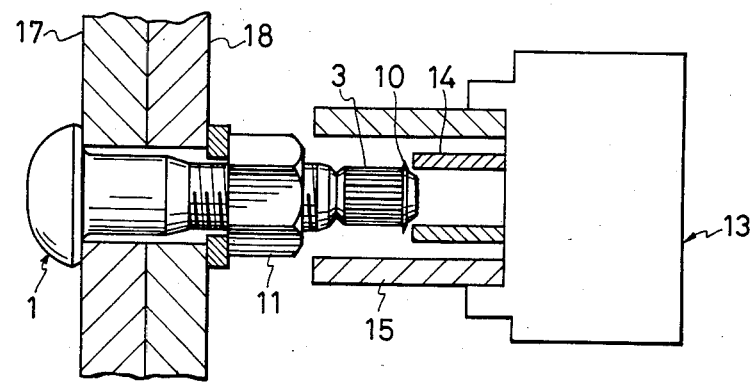
FIG. 4 shows the problem encountered when joining together steel plates with a conventional torque-bolt having unremoved burrs and tightened by a tightening machine.

The torque-shear bolt 20 thus formed is tightened up using the tightening machine 13 shown in FIG. 4. The inner socket 14 fits over the wrench-engaging surfaces 32 with no obstacle offered by the second burr 39 shown in FIG. 5.

Referring now to FIGS. 5 and 8 to 10, an example of a method of making the above torque-shear bolt will be described.

The prefastenable torque-shear bolt described above is made by a combination of steps (a) to (d) described below.

Figure 8:
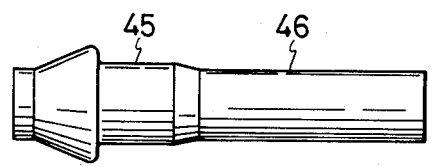
FIGS. 8, 9 and 10 show a series of steps by which a torque-shear bolt according to this invention is produced.

(a) Using a round bar or coiled rod, a shaft portion 45 and a portion 46 corresponding to the threaded portion 22 and grips 31 and 41, both portions being cylindrical in shape, are formed by forging as shown in FIG. 8.

Figure 9:
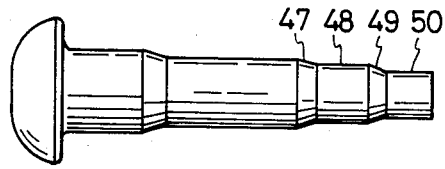

(b) Then, a portion 48 corresponding to the full-fastening grip 31 and a portion 50 corresponding to the prefastening grip 41, both portions being cylindrical in shape, are formed by forging as shown in FIG. 9, as a preliminary step of forge-forming the wrench-engaging surfaces 32 and 42 on the full-fastening grip 31 and prefastening grip 41 shown in FIG. 5. At the same time, portions 47 and 49 corresponding to the transition portions 23 and 33 and the break-off grooves 28 and 38 are formed into shapes resembling truncated cones.

Figure 10:
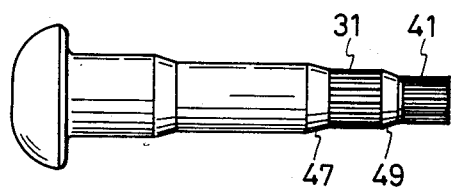

(c) The portions 48 and 50, cylindrically shaped in step (b) above, are finished to the final polygonal shapes of the full-fastening grip 31 and the prefastening grip 41 as shown in FIG. 10. The ratios between the diameters of circles circumscribed around and inscribed in the obtained polygonal shapes must be between 0.60 and 0.85 as previously mentioned. The two grips 31 and 41 may be formed in any order. Either one may be formed one before the other, or both may be formed simultaneously.

(d) Next, the full-fastening break-off groove 28 and the prefastening break-off groove 38 shown in FIG. 5 are formed by rolling. The two break-off grooves 28 and 38 may be roll-formed either simultaneously with or separately from the forming of the thread 22 on the bolt 20. Also, either one of the two grooves 28 and 38 may be formed one before the other. The diameter of the prefastening break-off groove 38 must be such as that is appropriate for the production of the axial force for prefastening. Meanwhile, the diameter of the full-fastening break-off groove 28 must be large enough to induce the axial force required to fully tighten the bolt 20.

What is claimed is:

1. A prefastenable torque shear bolt comprising:
   a bolt head at one end of said bolt;
   a bolt section extending from said bolt head and having a thread for engaging with a nut;
   a first transition section extending and tapered towards the center of said bolt from said bolt section, a full-fastening break-off groove in said first transition section;
   a full-fastening grip section extending from said full-fastening break-off groove, said full-fastening grip section having a plurality of wrench-engaging surfaces along the periphery thereof defining a first polygon around said periphery;
   a second transition section extending and tapered towards the center of said bolt from said full-fastening grip section, a prefastening break-off groove in said second transition section, the diameter of said bolt at said prefastening break-off groove being less than the diameter of said bolt at said full-fastening break-off groove for providing an effective fracture surface of said bolt at said prefastening break-off groove that is smaller than an effective fracture surface of said bolt at said full-fastening break-off groove;
   a prefastening grip section extending from said prefastening break-off groove and having a plurality of wrench-engaging surfaces along the periphery thereof defining a second polygon around the periphery of said prefastening grip section;
   diameters of first circles circumscribed around and inscribed in said first polygon being larger than diameters circumscribed around and inscribed in said second polygon respectively;
   a burr on said bolt associated with the formation of said full-fastening break-off groove and comprised of a first burr adjacent the full-fastening break-off groove and between the full-fastening break-off groove and the bolt section, a burr on said bolt associated with the formation of said prefastening break-off groove and comprised of a second burr adjacent the prefastening break-off groove and between the prefastening break-off groove and the full-fastening grip section;
   the ratio between the diameters of said second circumscribed circle and said first circumscribed circle and the ratio between the diameters of said second inscribed circle and said first inscribed circle each being between 0.60–0.85 such that said first burr does not extend radially outward of the thread bottom of said thread and said second burr does not extend radially outward of points on said bolt located on said first inscribed circle.

2. A prefastenable torque-shear bolt comprising:
   a bolt head at one end of said bolt;
   a bolt section extending from said bolt head and having a thread for engaging with a nut;
   a first transition section extending from said bolt section and having a taper tapered towards the center of said bolt from said bolt section to a full-fastening grip section, a full-fastening break-off groove in said first transition section;
   said full-fastening grip section extending from said first transition section and having a plurality of wrench-engaging surfaces along the periphery thereof;
   a burr associated with the rolling formation of said full-fastening break-off groove comprised of a first burr adjacent the full-fastening break-off groove and between the full-fastening break-off groove and the bolt section;
   said taper of said first transition section being such that said first burr does not extend radially outward of the thread bottom of said thread.

* * * * *